J. W. FIEBER.
HOT AIR HEATER.
APPLICATION FILED APR. 30, 1919.
1,352,804.
Patented Sept. 14, 1920.
2 SHEETS—SHEET 2.
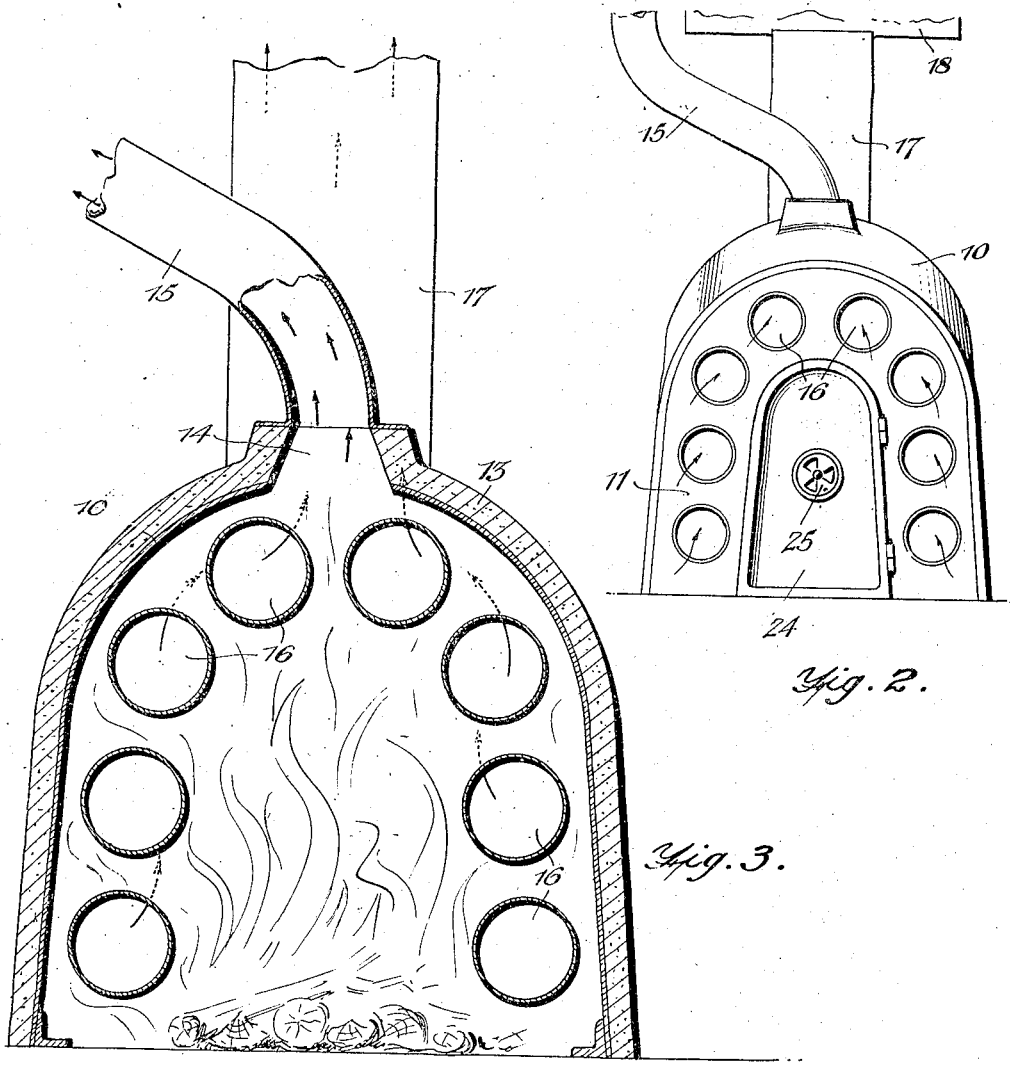
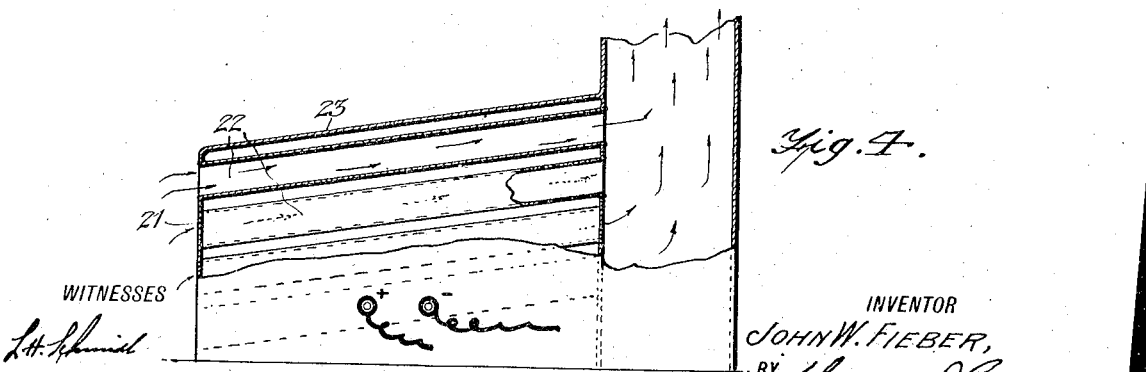
WITNESSES
INVENTOR
JOHN W. FIEBER,
BY
ATTORNEYS

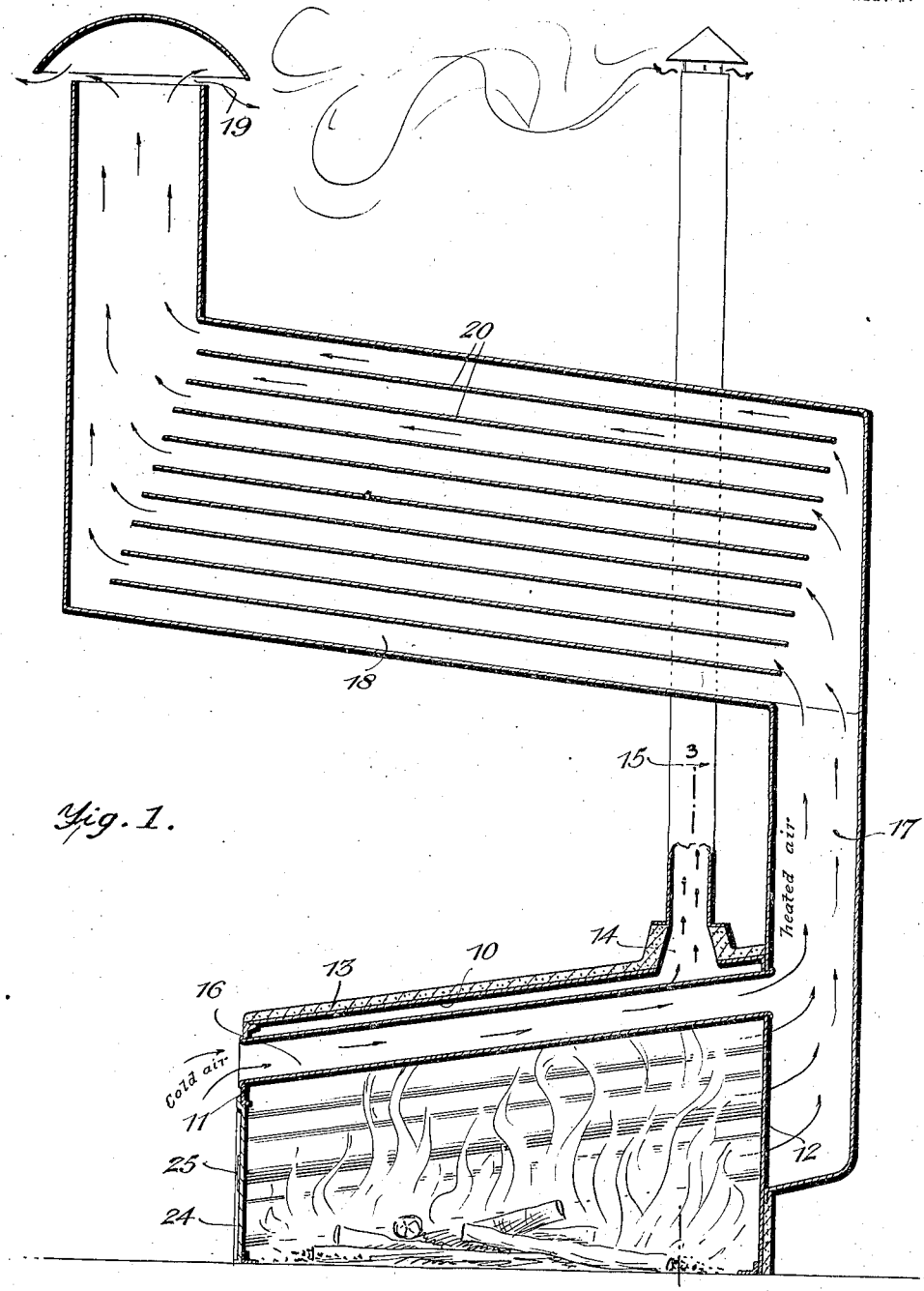

UNITED STATES PATENT OFFICE.

JOHN W. FIEBER, OF SHAW, OREGON.

HOT-AIR HEATER.

1,352,804.	Specification of Letters Patent.	Patented Sept. 14, 1920.

Application filed April 30, 1919. Serial No. 293,662.

*To all whom it may concern:*

Be it known that I, JOHN W. FIEBER, a subject of the King of Great Britain, and a resident of Shaw, in the county of Marion and State of Oregon, have invented a certain new and useful Improvement in Hot-Air Heaters, of which the following is a specification.

My present invention relates generally to hot air heaters and more particularly to devices for heating air for use in fruit evaporators, my object being the provision of a simple, inexpensive heater capable of utilizing a variety of heating means as well as one which will produce a very dry heated air supply and may be easily and quickly attended to.

A further object is the provision of a novel form of heater by means of which fruit may be dried more quickly than with the present heaters and with a proportionately reduced loss in weight and better color.

With these objects in mind I propose to replace the ordinary heater utilized for this purpose, by a structure in which air is taken into a plurality of air flues, each so placed in connection with the heater as to be subject to the action of the heating medium entirely therearound. I can in this way better maintain maximum efficiency particularly with burning wood and I am able to produce a more uniform and a drier heat than with the heaters now in common use wherein the heat or fire is passed through flues to heat the surroundings.

In the accompanying drawings, illustrating my invention and forming a part of this specification, Figure 1 is a vertical longitudinal section through my improved heater, illustrating its practical application.

Fig. 2 is a front elevation of my improved heater.

Fig. 3 is an enlarged cross section, and

Fig. 4 is a side view, partly in elevation and partly in section, illustrating a slightly modified form.

Referring now to these figures and particularly to Figs. 1 to 3 inclusive, my improvements propose a heater including a casing or shell 10 having a rounded top, and front and rear upright walls 11 and 12. The casing or shell gradually increases in height from its front to its rear and hence the rear wall 12 is of somewhat greater proportions than the front wall 11. The casing or shell 10 may have a lagging 13 thereover, and, in the most common form wherein wood or other burning fuel is utilized, is provided with an upper outlet 14 near its rear end to receive the lower end of a smoke pipe 15.

The above structure of the casing or shell provides for the effective rise from front to rear end of the entire series of air flues 16 arranged in an inverted U shape parallel to, and spaced from, the inner surface of the shell and over the top and at the sides of the fuel space in the lower portion of the shell. These air flues are also uniformly spaced from one another so as to permit of effective circulation of heat therearound and at the same time admit of free passage to the smoke pipe 15 to provide for free draft. These air flues 16 are extended at their forward and rear ends through the front and rear walls 11 and 12 as seen in Fig. 1, their lower forward ends opening into the atmosphere and their upper rear ends opening into the lower end of a hot air pipe 17 secured to the rear wall 12.

The hot air pipe 17 in the use to which the heater is primarily intended, connects at its upper end with a fruit chamber 18 having an outlet 19 and a series of shelves 20 for the fruit, all of these latter parts being shown in somewhat diagrammatic form in Fig. 1.

Where as in Figs. 1 to 3 inclusive, a burning fuel is utilized, the front wall 11 will of course have a door 24 preferably provided with a draft ring 25, but where a noncombustible heating medium is used, such as electricity as in Fig. 4, the front wall 21 is closed except for the flues 22 and the shell 23 is also closed as there is no necessity for an outlet. The same arrangement of flues exists as previously described in connection with Figs. 1 to 3 inclusive and the same advantages are to be derived.

I claim:—

A hot air heater including a portable casing of inverted U-form in cross section tapering from one end to the other and having small and large front and rear walls respectively, said casing having an open base and adapted to rest at its lower side edges on the ground, a plurality of air flues inclined within the heating chamber formed by said casing, in a series following the contour of the casing and opening at their opposite ends through the said front and rear walls, said flues being spaced from one another and from the casing in parallel relation, and a hot air pipe connected at its lower portion to the rear wall of the heater and in communication with the upper rear ends of the several air flues of the series, said casing having a door and an air inlet in its said front wall and an upper outlet adjacent to the rear wall, as described.

JOHN W. FIEBER.